May 12, 1942.  R. H. SHENK  2,282,532
BACK WATER VALVE
Filed June 13, 1940
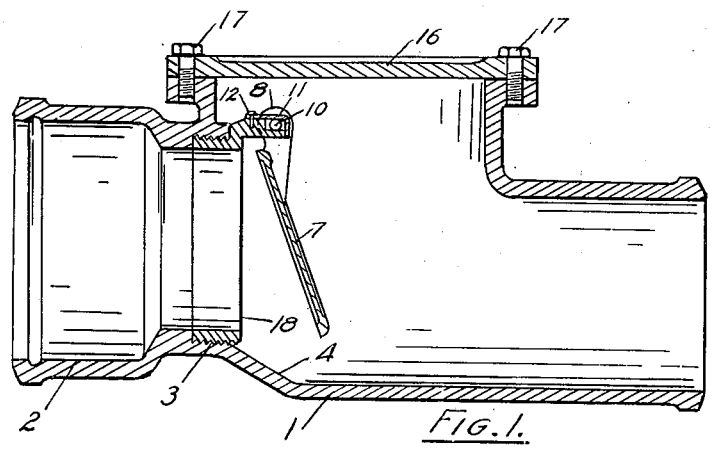
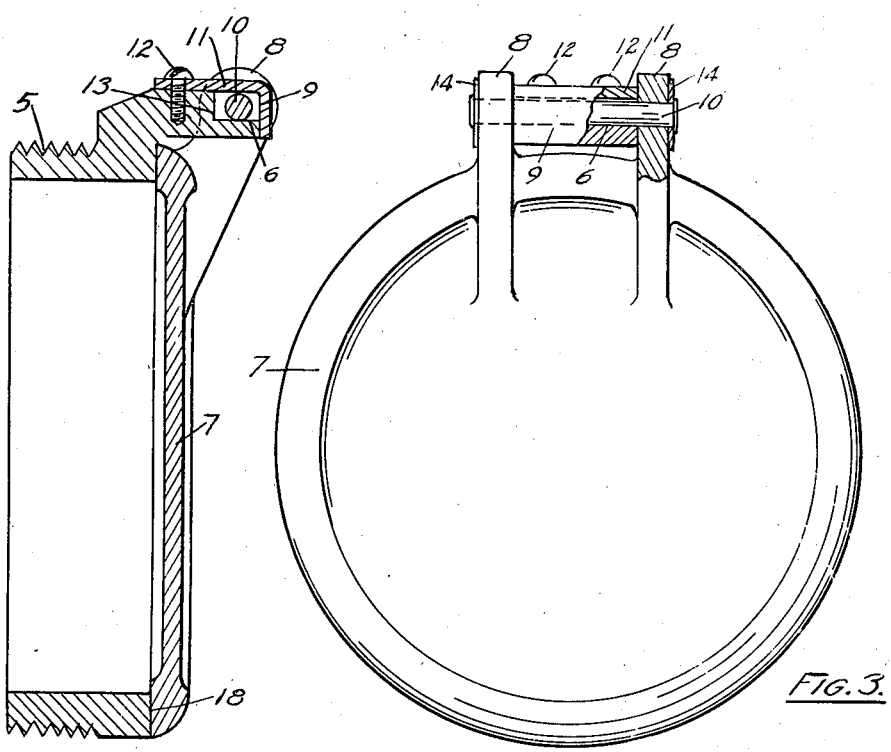
INVENTOR
Robert H. Shenk
BY
Florian S. Miller
ATTORNEYS Patented May 12, 1942

2,282,532

UNITED STATES PATENT OFFICE 2,282,532

BACK WATER VALVE

Robert H. Shenk, Erie, Pa., assignor to J. A. Zurn Manufacturing Company, Erie, Pa., a corporation of Pennsylvania Application June 13, 1940, Serial No. 340,238

5 Claims. (Cl. 251—123)

This invention relates generally to valves and more particularly to back water valves for use in drain lines.

All devices of this character made according to the teachings of the prior art and with which I am familiar have been very inefficient in checking the back water because the swinging valve gate could not be closed because of debris formed in the line and around the seat upon which the swinging gate valve seated. These prior valves were constructed so that debris could easily form to prevent the swinging valve from moving to a closed position, thus permitting the water to feed back into the line. The principal disadvantage of these prior devices has been the hinge means for swinging the gate valve. These means became readily corroded and many times the pins holding the gate valve would not rotate, thus preventing the closing of the gate valve.

It is, accordingly, an object of my invention to overcome the above and other defects in back water valves and more particularly to provide a back water valve which is cheap in cost, efficient in operation, easy to install and economical in manufacture.

Another object of my invention is to provide a means for swinging a gate valve freely without the freezing thereof.

Another object of my invention is to provide for swinging a gate valve in a drain line which is sealed to fouling.

Another object of my invention is to provide a means for swinging a gate valve which permits longitudinal movement of the gate valve.

Another object of my invention is to provide a gate valve wherein the formation of debris therein around the seat of the swinging valve is brought to a minimum.

Another object of my invention is to provide a hinge in a back water valve with a line contact roller support.

Another object of my invention is to provide a hinge in a back water valve with a generally free movement.

Other objects of my invention will become evident from the following detailed description, taken in conjunction with the accompanying drawing, in which Fig. 1 is a side elevational view in cross-section, showing the disposition of my novel back water valve in a pipe line.

Fig. 2 is an enlarged fragmentary sectional view showing the means for swinging the gate valve.

Fig. 3 is an end view with parts broken away of the swinging gate valve.

Referring to the drawing, Fig. 1 shows a casing 1 having a hub 2 for a connection to a pipe or conduit. The casing 1 has a threaded aperture 3 and a portion 4 leading away from the aperture inclined downwardly to prevent the formation of material at this point. A threaded annular member 5 is engaged with the threaded aperture 3 of the casing, and has integrally formed therewith supporting surface 6 and an annular valve seat 18. A swinging gate 7 having apertured ears 8 integrally formed therewith is supported on the supporting surface 6 by means of a pin 10. The pin 10 turning on the flat supporting surface 6 provides line contact for the gate 7. An angular shaped cover member 11 secured by screw means 12 holds the pin 10 on the supporting surface 6, through its downwardly extending front portion 9 and furthermore seals the pin 10 from fouling material. The pin 10 is free to move laterally along the supporting surface 6 within predetermined limits as defined by the angular cover member 11 and the wall 13 to the rear of the supporting surface 6. The outer side surfaces of the ears 8 are machined by any suitable means and washers 14 are disposed over the pins 10 in engagement with the outer side surface of the ears 8 to seal said pin and contacting and adjacent areas from fouling matter. A top cover 16 secured by bolts 17 is disposed on the casing 1 for cleaning out the area surrounding the gate 7.

In operation the gate 7 will move against its seat 18 when back water enters the casing 1. The generally free movement of the pin 10 permits better sealing of the aperture 3 in the casing 1. This is especially so if debris prevents the closing of the bottom portion of the gate since the upper portion will move inwardly to close the valve much more than if the gate were on a fixed hinge. The inclined surface 4 leading away from the aperture 3 prevents the formation of fouling material to prevent the closing of the gate 7. When a drop-off was provided in prior constructions, fouling matter would form at this point and prevent the closing of the gate 7. The gate 7 is free to move on the pin 10 in nearly any direction. It is, therefore, evident that the pin will have to be frozen at its point of support as well as the point of its engagement with the ears 8 of the gate 7 before it would be completely frozen and thereby become inoperative. The washer 14 in contact with the outer side surface of the ears 8 along with the angular cover 11 covering the pin 10 seal the pin to fouling matter.

It will be quite evident that I have provided a back water valve for a pipe line wherein the gate moves freely, and the means for swinging the gate is sealed from fouling, and it is practically free from freezing.

Various changes may be made in the specific embodiment of the present invention without departing from the spirit thereof or from the scope of the appended claims.

What I claim is:

1. In a back water valve, in combination, a casing having an aperture, a gate valve covering said aperture and having upwardly extending ears having apertures, a laterally movable freely rotatable pin for supporting said gate valve extending through the apertures in said ears, a flat surface support upon which said pin is supported in rolling relation therewith disposed between said ears, and a cover member for limiting the lateral movement of said pin and for aiding in sealing said pin from fouling matter.

2. In a back water valve, in combination, a casing having an aperture, a gate valve covering said aperture and having upwardly extending ears with apertures, a laterally movable pin disposed in the apertures of said ears upon which said gate valve swings, a flat surface support upon which said pin is mounted for rolling action, a cover member for limiting the lateral movement of said pin, and washers on said pin engaging the outer side surfaces of said ears, said washers, ears, and said cover sealing said pin from fouling matter.

3. In a back water valve, in combination, a casing having an aperture, a gate valve covering said aperture and having apertured ears in parallel relationship, a pin extending through said apertured ears for supporting said gate valve, a flat surface support upon which said pin is mounted for rolling action, a cover member for limiting the lateral movement of said pin and for aiding in sealing said pin from fouling material, and washers on said pin engaging the outer side surfaces of said ears to further aid in sealing said pin from fouling matter.

4. In a back water valve, in combination, a casing having an aperture, a gate valve covering said aperture and having an apertured portion, a pin for hingedly supporting said gate valve disposed in said apertured portion of said gate valve freely rotatable therein relative thereto, a flat surface support on which said pin is mounted in rolling relation therewith, and means for sealing the bearing surface of said pin from fouling matter.

5. A back water valve comprising a casing having an aperture, a gate valve covering said aperture and having an apertured portion, a pin for hingedly supporting said gate valve disposed in said apertured portion of said gate valve freely rotatable therein relative thereto, a flat supporting surface upon which said pin is mounted for rolling action, sealing means for said pin, and means for limiting the lateral movement of said pin on said supporting means.

ROBERT H. SHENK.